(12) United States Patent
Weithe et al.

(10) Patent No.: US 6,844,923 B2
(45) Date of Patent: Jan. 18, 2005

(54) METHOD AND APPARATUS FOR SURVEYING THE GEOMETRY OF TUNNELS

(75) Inventors: Gerhard Weithe, Wetter (DE); Werner Endres, Frankfurt am Main (DE); Christian Neumann, Absam (AT); Colin Eddie, Warwickshire (GB)

(73) Assignees: Morgan Est plc, Warwickshire (GB); Beton- und Monierbau GesmbH, Innsbruc (AT)

( * ) Notice: Subject to any disclaimer, the term of this patent is extended or adjusted under 35 U.S.C. 154(b) by 0 days.

(21) Appl. No.: 10/340,013

(22) Filed: Jan. 10, 2003

(65) Prior Publication Data

US 2003/0145658 A1 Aug. 7, 2003

(30) Foreign Application Priority Data

Jan. 22, 2002 (GB) .............................. 0200621

(51) Int. Cl.⁷ ................................ G01C 3/08
(52) U.S. Cl. ...................... 356/4.01; 356/5.01; 356/5.1
(58) Field of Search ............... 356/3.01–5.15

(56) References Cited

U.S. PATENT DOCUMENTS 3,705,772 A * 12/1972 Andreas .................... 356/5.08
3,950,096 A * 4/1976 Aeschlimann et al. ..... 356/3.05
4,063,283 A * 12/1977 Rider et al. ................. 348/135
4,179,216 A * 12/1979 Theurer et al. ............ 356/4.01
4,180,322 A * 12/1979 Farcinade ................. 356/3.06
4,355,895 A * 10/1982 Cairns et al. ............ 356/141.1
4,708,395 A * 11/1987 Petry et al. ................... 299/17
5,237,384 A * 8/1993 Fukunaga et al. ..... 356/139.06

FOREIGN PATENT DOCUMENTS

JP     2-227605       * 10/1990

OTHER PUBLICATIONS

"Tunnel-Scan", Geodigital-Software U. Messtechnik G.m.b.H.
"Tunnel Check", Geodigital-Software U. Messtechnik G.m.b.H.

* cited by examiner

Primary Examiner—Bernarr E. Gregory
Assistant Examiner—Brian Andrea
(74) Attorney, Agent, or Firm—Dann, Dorfman, Herrell and Skillman, P.C.; Henry H. Skillman

(57) ABSTRACT

This invention relates to a method and apparatus for surveying the geometry of tunnels comprising measuring the position of a tunnel surface relative to an absolute three-dimensional coordinate system, using at least one reflectorless distance sensor mounted for orientation in three dimensions and calculating a deviation from a predefined geometry for the surface and displaying said deviation in real time.

7 Claims, 1 Drawing Sheet

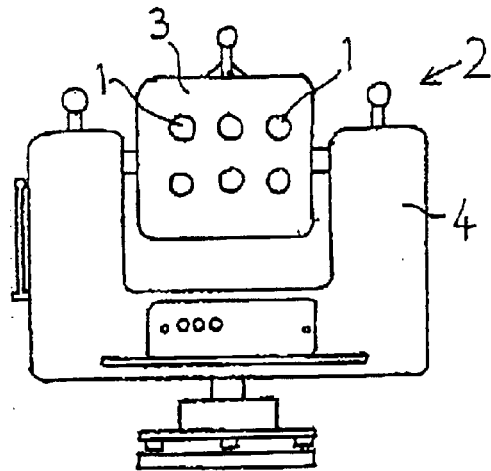
Fig. 1
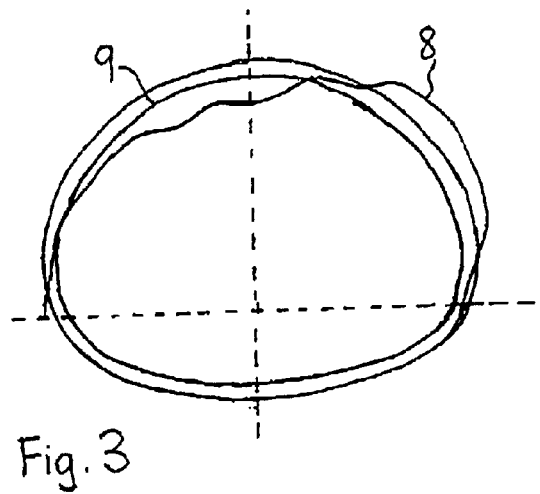
Fig. 3
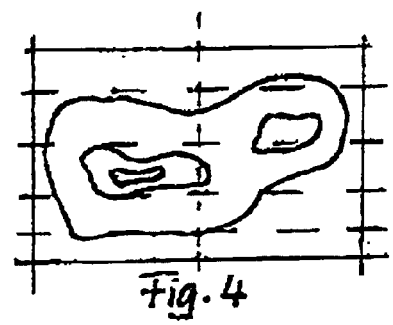
Fig. 4
Fig. 2
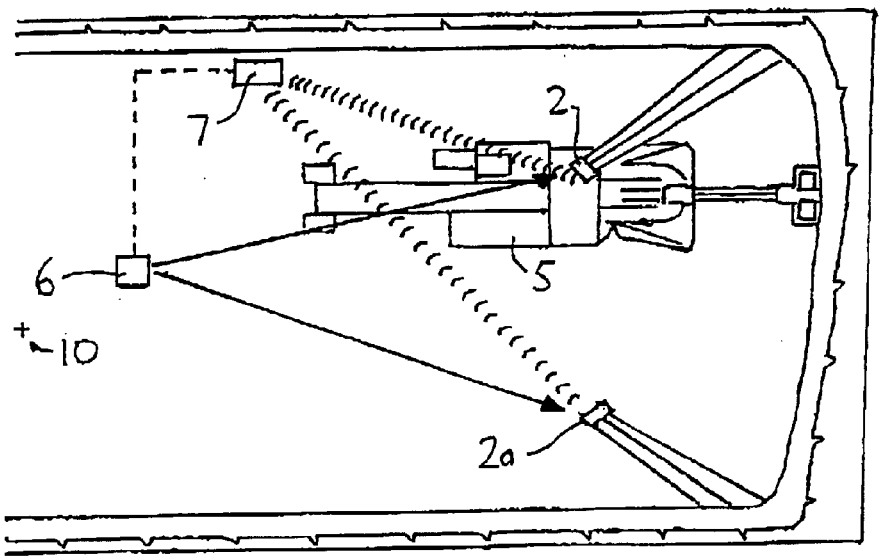

METHOD AND APPARATUS FOR SURVEYING THE GEOMETRY OF TUNNELS

This invention relates to a method and apparatus for surveying the geometry of tunnels.

In tunnelling, an exact survey of the excavation and permanent lining is indispensable. A variety of different methods and devices have been proposed. Some of these operate in real time. Others illuminate an excavation face to guide an operator working on the face. However, there remains a requirement for a system which can both guide the excavation work and check its accuracy in real time.

The invention provides a method of surveying the geometry of a tunnel, comprising measuring the position of a tunnel surface relative to an absolute three-dimensional coordinate system using at least one reflectorless distance sensor mounted for orientation in three dimensions and calculating a deviation from a predefined geometry for the surface and displaying said deviation in real time.

The expression "tunnel surface" includes a permanent tunnel lining as well as an excavation surface.

In a preferred embodiment of the method, the position of the at least one distance sensor itself is found using a servo theodolite.

The at least one distance sensor may be mounted on a device which is carried by a machine modifying the tunnel surface, such as an excavator or shotcrete manipulator.

The invention also provides apparatus for surveying the geometry of a tunnel, comprising a measurement unit including at least one reflectorless distance sensor mounted for orientation in three dimensions for measuring the position of a tunnel surface relative to an absolute three-dimensional coordinate system, means for calculating a deviation from a predefined geometry for the surface and means for displaying said deviation in real time.

Preferably, the measurement unit includes a plurality of reflectorless distance sensors.

In order that the present invention may be more readily understood, reference will now be made, by way of example only, to the accompanying drawings, in which:

FIG. 1 shows a measurement unit according to an embodiment of the invention;

FIG. 2 schematically shows a measurement system incorporating the measurement unit of FIG. 1;

FIG. 3 shows a display of a measured actual profile compared with a designed profile; and FIG. 4 shows schematically a surface area display with iso-lines.

FIG. 1 shows a measurement unit comprising a plurality (six in this example) of reflectorless laser distance sensors 1. The sensors 1 are mounted on a measurement unit 2 comprising a head 3 journalled for rotation about a horizontal axis on a yoke 4, which is rotatable about a vertical shaft. Thus the sensors 1 can be directed at any part of a tunnel surface.

The position of the measurement unit with respect to an absolute x, y, z coordinate grid at any time is known with a high degree of accuracy. For establishing the positioning of the measurement beams, wide-angle sensors are mounted in such a way that it is possible to measure both the horizontal and vertical rotation and/or incline of the unit. Deviation form a horizontal line is measured using an inclinometer. Two adapted target units (e.g. glass prisms, LEDs or target marks) allow target locking modes and adjusting measurement with the help of a servo theodolite.

FIG. 2 shows how the measurement unit 2 can be mounted on an excavator 5, within reach of the operator of the excavator who is operating the unit 2. The operator points the unit directly at the area of topical lining being worked on. During excavation works in tunnelling, continuous information on the position of the minimum border of the reference or excavation profile is of specific interest. In shotcrete or profiling works, knowledge of the topical sprayed concrete layer with regard to plan geometry is of decisive significance. By installing the measurement unit 2 on the excavator 5, permanent target locking and excavator measurement is possible, allowing the position of the measurement unit to be deduced from the geometry of the machine.

Preferably a commercially available servo theodolite 6 is mounted at a fixed station such as a wall bracket in the rear section of the tunnel lining that has already been secured. Its position with respect to the coordinate grid is therefore known.

The position of the measurement unit 2 is derived by taking measurements to at least two, preferably three, stable reference targets (not shown), such as glass prisms or LEDs, the position of which is known, and is measured using the auto-lock function of the servo theodolite 6.

The measurement unit 2 is orientated by aiming one of the laser sensors 1, designated a pointing laser, at a laser reference target 10. The orientation of the unit is calculated using the previously calculated coordinates of the unit 2 and the angles to the target. Alternatively the orientation of unit 2 is calculated by using the coordinates of the reference targets mounted on unit 2 and the horizontal angle corresponding to the measurements of the targets by servo theodolite 6.

The operator points the unit 2 to any area of the tunnel wall or working face. This area is defined by the grid of the laser sensors 1. The deviations of this area from a designed reference profile are transmitted to a main industrial PC 7 by radio link or cable, displayed and stored in a three dimensional database.

In an alternative embodiment, a measurement unit 2a is positioned freely close to the excavation area, for example on a tripod or a bracket firmly mounted on the excavation lining. In the latter case, the unit 2a is directly tracked and permanently measured via adapted target units.

The entire surveying and evaluation process of the present invention is controlled by the industrial PC 7. The current values measured by the measurement unit 2 or 2a and the servo theodolite 6 are perpetually received via radio connected data transfer or cable, transformed into centre line, gradient and reference profile and displayed on an internal and/or external display in the machine operator's cabin of the excavator 5 or of a shotcrete robot (not shown). As mentioned above, the 3-D position of the measurement unit 2 in space is first of all established by means of absolute measurement. The current orientation of the target beam is then derived from the data provided by the wide-angle sensors 1 and inclinometers. Based on the results of the perpetual simultaneous distance measurements performed by the integrated distance sensors of the surveying device, each measurement is subject to renewed coordinate computation of the measurement points on the object model. As shown in FIG. 3, the findings are subsequently transformed and displayed as 8 compared with the CAD model 9 drawn up during planning. The result is made available in the machine operator's cabin in real time in the form of visualised differences from the target geometry and may be used, for instance, by the machine operator, for further working on the geometry. FIG. 4 is an alternative display showing a surface area with iso-lines.

The method and device of the present invention, as opposed to standard surveying methods, results in an immediate display of the result. The scanned grid measured on site allows an interpolated representation of the area that completely suffices in order to enable the machine operator to assess the quality of the construction process in his particular section. As the work progresses, the manually or motor-driven grid of beams is steadily advanced, with recently measured profile differences being stored in the database and the display, while newly measured results are continually being added. As a result, an exact three-dimensional representation documenting the actual geometric construction lining in relation to the CAD planning is drawn up during completion of the entire section subject to excavation and/or permanent lining. In this context, alignment of the measurement grid is greatly facilitated by an intensive marking laser spot, e.g. at the centre of the measurement grid. A final survey of the working area may document the field of topical lining in terms of excavation and lining safeguards, thus delivering information important for the economic success of tunnelling to the site engineers. By incorporating the CAD draft into work execution and due to a reflux of survey data provided by the inventory documentation, the surveying device described herein constitutes an essential component of a method of CAD/CAM tunnelling.

In the event of a system failure, the target locking servo theodolite 6 switches on a standard add on laser, drawing a line parallel to the minimum excavation and/or permanent lining by means of a permanently running laser spot at the face of the tunnel. This ensures a rough orientation by means of manual measurements, ensuring that excavation work does not stop.

The method in accordance with the present invention is of particular advantage in the field of excavation/shotcreting works lacking support structures such as conventional lattice girders and/or reinforcements. Due to the absence of profile forming lining elements, the site staff lack orientation both in the longitudinal and radial direction of the tunnel. This kind of construction mode does not allow a conventional delimitation of the length of advance so that without additional measuring devices compliance with predetermined levels of concrete thickness may no longer be guaranteed on account of the missing primary lining. Thus, the method according to the present invention is of particular benefit wherever the staff must not enter the working area.

When conducting lining measures such as spiles, pile sheets and drill holes or so-called temporary profile arches, the system applied in accordance with the present invention is switched to the single shot mode for localising predefined or iterative reference points that need to be ascertained. In this case the intensive marking laser spot located at the center of the grid is used for marking the respective point of reference in the event of the surrounding distance sensor measurements being switched off. The single shot mode is still required for recording advance positioning, measuring individual levels of shotcrete thickness as well as reorienting the device for checking system accuracy by referring to completed reference targets.

What is claimed is:

1. A method of surveying the geometry of a tunnel, comprising measuring the position of a tunnel surface relative to an absolute three-dimensional coordinate system using at least one reflectorless distance sensor mounted for orientation in three dimensions and calculating a three-dimensional deviation from a predefined geometry for the surface and displaying said deviation in real time.

2. A method according to claim 1 wherein, the position of the at least one distance sensor itself is found using a servo theodolite.

3. A method according to claim 1, wherein the at least one distance sensor is mounted on a device which is carried by a machine modifying the tunnel surface.

4. Apparatus for surveying the geometry of a tunnel, comprising a measurement unit including at least one reflectorless distance sensor mounted for orientation in three dimensions for measuring the position of a tunnel surface relative to an absolute three-dimensional coordinate system, means for calculating a three-dimensional deviation from a predefined geometry for the surface and means for displaying said deviation in real time.

5. Apparatus according to claim 4, wherein the measurement unit includes a plurality of reflectorless sensors.

6. Apparatus according to claim 4, wherein the at least one distance sensor is mounted on a device which is carried by a machine modifying the tunnel surface.

7. Apparatus according to claim 4, wherein the at least one reflectorless distance sensor is positioned on a tripod or bracket firmly mounted on the excavation lining.

* * * * *